US012709288B2

(12) United States Patent
Snyder et al.

(10) Patent No.: US 12,709,288 B2
(45) Date of Patent: Aug. 18, 2026

(54) VEHICLE NOTIFICATION SYSTEMS AND METHODS

(71) Applicant: Allstate Insurance Company, Northbrook, IL (US)

(72) Inventors: Jennifer L. Snyder, Northbrook, IL (US); Trent Bohacz, Northbrook, IL (US); Michael O'Connor, Northbrook, IL (US); Jeffrey Schlitt, Northbrook, IL (US); Tai-Yip Kwok, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/672,540

(22) Filed: May 23, 2024

(65) Prior Publication Data

US 2025/0360937 A1 Nov. 27, 2025

(51) Int. Cl.

| | |
|---|---|
| ***B60Q 1/00*** | (2006.01) |
| ***B60W 50/00*** | (2006.01) |
| ***B60W 50/14*** | (2020.01) |
| ***G06Q 30/0207*** | (2023.01) |
| ***G06Q 40/08*** | (2012.01) |

(52) U.S. Cl.

CPC ........ *B60W 50/14* (2013.01); *B60W 50/0097* (2013.01); *G06Q 30/0207* (2013.01); *G06Q 40/08* (2013.01); *B60W 2050/143* (2013.01); *B60W 2050/146* (2013.01); *B60W 2530/20* (2013.01); *B60W 2555/20* (2020.02); *B60W 2556/50* (2020.02)

(58) Field of Classification Search

CPC ............. B60W 50/14; B60W 50/0097; B60W 2050/143; B60W 2050/146; B60W 2530/20; B60W 2555/20; B60W 2556/50; G06Q 30/0207; G06Q 40/08

USPC ......................... 340/438, 439, 442, 445, 447

See application file for complete search history.

(56) References Cited

U.S. PATENT DOCUMENTS 5,765,119 A 6/1998 Otabe et al.
2004/0046648 A1 * 3/2004 Matsuura ............. B60C 23/061 340/442

(Continued)

FOREIGN PATENT DOCUMENTS

CN 114677160 A 6/2022
CN 115179693 A 10/2022

(Continued)

*Primary Examiner* — Anh V La

(74) *Attorney, Agent, or Firm* — Dinsmore & Shohl LLP

(57) ABSTRACT

Systems and methods for notifying a user of a vehicle include at least one processor and a vehicle tire sensor of a vehicle associated with at least one tire. The vehicle tire sensor generates at least one vehicle tire metric associated with the at least one tire of the vehicle. Machine readable instructions stored in a memory cause the vehicle notification system to perform at least the following when executed by the processor: receive the at least one vehicle tire metric from the vehicle tire sensor associated with the at least one tire of the vehicle, receive a weather tire type of the at least one tire of the vehicle, generate, based on the on the at least one vehicle tire metric and the weather tire type, at least one determined metric, and generate an alert for a user of the vehicle of the at least one determined metric.

20 Claims, 5 Drawing Sheets

(56) References Cited

U.S. PATENT DOCUMENTS

| | | | | |
|---|---|---|---|---|
| 2016/0110930 | A1* | 4/2016 | Denny | F16H 63/40 701/1 |
| 2017/0129289 | A1* | 5/2017 | Ascanelli | B60C 11/0306 |
| 2018/0068495 | A1* | 3/2018 | Chainer | G07C 5/008 |
| 2020/0342760 | A1 | 10/2020 | Vassilovski et al. | |
| 2021/0049445 | A1 | 2/2021 | Bielby et al. | |
| 2021/0146945 | A1 | 5/2021 | Brown et al. | |
| 2023/0373514 | A1* | 11/2023 | Just | G07C 5/0816 |
| 2025/0206074 | A1* | 6/2025 | Koppisetty | B60C 23/002 |

FOREIGN PATENT DOCUMENTS

| | | | |
|---|---|---|---|
| DE | 10155672 | A1 | 5/2023 |
| EP | 3581404 | A1 | 12/2019 |
| JP | 2009-244167 | A | 10/2009 |
| JP | 2019-190959 | A | 10/2019 |
| WO | 2004038627 | A1 | 6/2004 |
| WO | 2016006234 | A1 | 1/2016 |

* cited by examiner

VEHICLE NOTIFICATION SYSTEMS AND METHODS

TECHNICAL FIELD

The present disclosure relates to vehicle notification systems and methods and, in particular, vehicle notification systems and methods using at least one vehicle tire metric and a weather tire type to generate and alert the user of a determined metric.

BACKGROUND

A vehicle may have different maneuverability characteristics depending on a type of tire of a vehicle along with other vehicle driving characteristics. For example, winter tires with deeper tread than all-season tires may be desired when a vehicle is traveling through winter weather conditions. A need exists for an efficient vehicle system tracking tire type along with vehicle driving characteristics to aid with vehicle maneuverability.

BRIEF SUMMARY

Aspects of the present disclosure relate to notification systems. In particular, aspects of the disclosure relate to notification systems integrated into a vehicle.

According to subject matter of the present disclosure, a vehicle notification system may include at least one processor, a vehicle including at least one tire, and a vehicle tire sensor of the vehicle associated with the at least one tire. The vehicle tire sensor may be communicatively coupled to the at least one processor and the vehicle tire sensor may generate at least one vehicle tire metric associated with the at least one tire of the vehicle. The vehicle notification system may further include a memory communicatively coupled to the at least one processor and one or more machine readable instructions stored in the memory that cause the vehicle notification system to perform at least the following when executed by the at least one processor: receive the at least one vehicle tire metric from the vehicle tire sensor associated with the at least one tire of the vehicle, receive a weather tire type of the at least one tire of the vehicle, generate, based on the on the at least one vehicle tire metric and the weather tire type, at least one determined metric, and generate an alert for a user of the vehicle of the at least one determined metric.

According to another embodiment of the present disclosure, a vehicle notification system may include at least one processor, a vehicle including at least one tire, and a vehicle tire sensor of the vehicle associated with the at least one tire. The vehicle tire sensor may be communicatively coupled to the at least one processor and the vehicle tire sensor may generate at least one vehicle tire metric associated with the at least one tire of the vehicle. The vehicle notification system may also include a memory communicatively coupled to the at least one processor and one or more machine readable instructions stored in the memory that cause the vehicle notification system to perform at least the following when executed by the at least one processor: receive the at least one vehicle tire metric from the vehicle tire sensor associated with the at least one tire of the vehicle, receive a weather tire type of the at least one tire of the vehicle, wherein the weather tire type is indicative of a season type that the tire is made for and corresponding treading such that a treading for a first season type is deeper than a treading for a second season type, and generate, based on the on the at least one vehicle tire metric and the weather tire type, at least one determined metric. The machine readable instructions may further cause the vehicle notification system to generate a corresponding recommendation for the at least one determined metric, generate an alert for the user of the at least one determined metric and the corresponding recommendation, and transmit the alert to the user when the at least one metric exceeds a threshold.

According to yet another embodiment of the present disclosure, a method for generating a vehicle notification may include receiving, by a computing device of a vehicle, at least one vehicle tire metric from a vehicle tire sensor associated with at least one tire of the vehicle and receiving a weather tire type of the at least one tire of the vehicle. The method may also include generating, based on the on the at least one vehicle tire metric and the weather tire type, at least one determined metric and generating an alert for a user of the vehicle of the at least one determined metric.

Although the concepts of the present disclosure are described herein with primary reference to a vehicle notification system for integration into insurance policies/businesses, it is contemplated that the concepts will enjoy applicability to any setting for purposes of vehicle notification systems, such as any loan, safety, or any other like purposes.

BRIEF DESCRIPTION OF THE SEVERAL VIEWS OF THE DRAWINGS

The present disclosure is illustrated by way of example and not limited in the accompanying figures in which like reference numerals indicate similar elements and in which.

DETAILED DESCRIPTION

Embodiments of the present disclosure are directed to vehicle notification systems and methods that utilize at least one tire metric and a weather tire type to determine and notify the user of the determined metric. The at least one determined metric may include a likelihood of hydroplaning, a minimum stopping distance, a likelihood of an accident along a route, or combinations thereof. As such, the driver may be able to take corrective action to minimize risk within sufficient time to avoid and/or reduce or prevent chances of a potential accident, which is described in greater detail further below.

Figure 1:
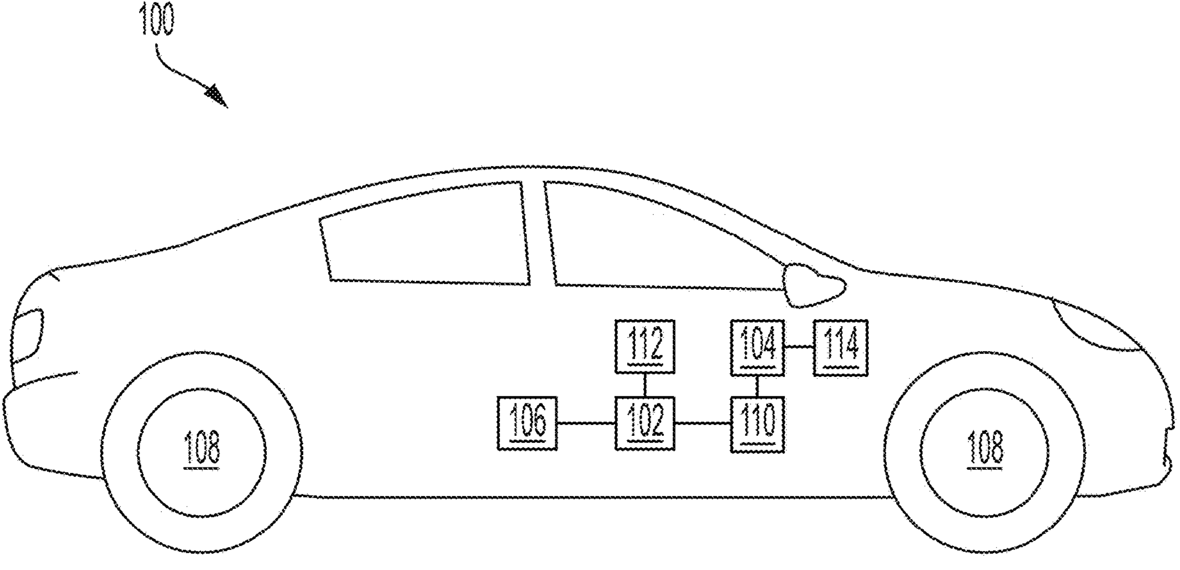
FIG. 1 illustrates a vehicle with a vehicle notification system, according to one or more embodiments shown and described herein.
Figure 2:
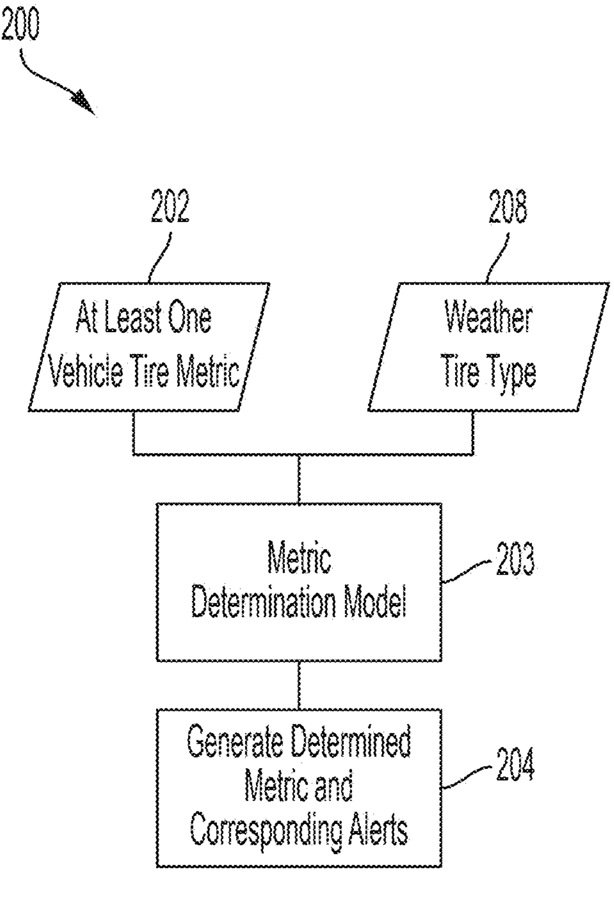
FIG. 2 illustrates a system diagram associated with the vehicle of FIG. 1, according to one or more embodiments shown and described herein.

In embodiments described herein, a system (e.g., such as system 500 of FIG. 5, described in greater detail below) for use with a vehicle 100 of FIG. 1 and associated system diagram 200 of FIG. 2 may be used to notify a driver of at least one vehicle metric. The vehicle may be an automotive vehicle such as a car, truck, recreational vehicle, or other similar automotive transport.

Referring to FIG. 1, a vehicle 100 may include communicatively coupled components such as a vehicle tire sensor 102, a vehicle processor 104, a vehicle memory 106, at least one tire 108, a vehicle display 110, a navigation module 112, and vehicle audio components 114. The navigation module 112 may include a location sensor and a navigation sensor. The location sensor may be configured to generate a location of the vehicle 100. The location sensor may be part of a global positioning system (GPS) to determine vehicle location. The vehicle display 110 may include a graphical user interface (GUI) for user display and/or interaction and be configured to provide visual alerts such as map and/or text displays as described hereon. The navigation sensor may be configured to generate a navigation route or a predicted navigation route of the vehicle 100 based on the location of the vehicle 100 determined by the location sensor. The vehicle audio components 114 may include one or more speakers, microphones, or combinations thereof.

Referring to FIG. 2, a system diagram 200 associated with the vehicle 100 is shown and includes (i) at least one vehicle tire metric 202 and a weather tire type 208 as inputs, (ii) a metric determination model 203, and (ii) a generated determined metric and corresponding alerts 204 as outputs. The vehicle tire sensor 102 (FIG. 1) may include any sensor capable of generating at least one vehicle tire metric 202 (FIG. 2) of at least one tire 108 of the vehicle 100 (FIG. 1). The vehicle tire sensor 102 may include a tire pressure sensor configured to determine a tire pressure level of the at least one tire, wherein the at least one vehicle tire metric comprises the tire pressure level. As such, the vehicle tire sensor 102 may include a pressure sensor that may determine a pressure within the tire, camera, infrared sensor, tire speed sensor, or any other suitable tire sensor for generating the at least one vehicle tire metric 202. In some embodiments, the at least one vehicle tire metric 202 may include historical tire pressure with respect to the at least one tire 108; as such, the at least one vehicle tire metric 202 may include gradual tire pressure decrease due to driving and/or weather changes. The at least one vehicle tire metric 202 may also include sudden increases in tire pressure due to potholes or sharp turns. As such, data received from the vehicle tire sensor 102 with respect to the at least one vehicle tire metric 202 may be stored on the vehicle memory 106, such as historical tire pressure data. The at least one vehicle tire metric 202 may also include tire temperature data, as sensed by the infrared sensor, or a tire speed, as sensed by the tire speed sensor.

Referring to FIG. 2, the at least one vehicle tire metric 202 may be utilized in combination with an input of the weather tire type 208 of at least one tire 108 into the metric determination model 203. The metric determination model 203 may be implemented by the vehicle processor 104 to generate at least one determined metric and corresponding alerts 204. In embodiments, the weather tire type 208 may be indicative of a season type that the tire is made for and corresponding treading such that a treading for the first season type is deeper than a treading for a second season type. The first season type may be associated with winter such that the weather tire type 208 is a winter tire for the at least one tire 108, while the second season type is associated with all-seasons, such that the weather tire type 208 is an all-seasons tire for the at least one tire 108.

Generally, the winter tire has a treading that is deeper compared to that of the all-seasons tire. However, deepness of treading may also depend on how many miles the tire has been driven (i.e., wear on the tire). Thus, the at least one vehicle tire metric 202 may also provide a deepness of treading on the at least one 108 regardless of season type or other tire type. Referring again to weather tire type, a winter tire also generally has more and deeper treading covering a cross-sectional area of an exterior surface of the vehicle tire, such as to provide more traction between the road and the at least one tire 108. In embodiments, the winter tire has a higher coefficient of friction with the road than when compared to that of the all-seasons tire. Accordingly, the winter tire is less likely to slip when on wet and/or icy road conditions. The season type may be associated with summer, fall, spring, or any other suitable season type. In some embodiments, the weather tire type 208 may not be indicative of a season type, but a tire use type, such as a racing tire, off-road tire, or any other suitable tire use type.

The weather tire type 208 may be determined a variety of manners. In some embodiments, the weather tire type 208 may be manually entered by the user. The user may enter the weather tire type 208 on the GUI of the vehicle display 110 of the vehicle 100. In other embodiments, the user may enter the weather tire type 208 on a GUI of a user mobile device that may be communicatively coupled to the vehicle 100. The user may manually enter the weather tire type 208 or the user may select from a list of predetermined weather tire types displayed on the GUI of the vehicle display 110 or the user mobile device. Additionally or alternatively, the weather tire type 208 of the at least one tire 108 may be stored in the vehicle memory 106 when the at least one tire 108 is placed on the vehicle 100 and along with other vehicle characteristics.

The user mobile device may be a smart mobile device, which may be a smartphone, a tablet, or a like portable handheld smart device. As a non-limiting example, the user mobile device may be a smartphone or a tablet. The user mobile device includes a camera, a processor (e.g., the processor 504 of FIG. 5, described in greater detail below), a memory (e.g., the memory component 506 of FIG. 5) communicatively coupled to the processor, and machine readable instructions stored in the memory. The machine readable instructions may cause the system 500 to, when executed by the processor, launch and operate a software application tool on the user mobile device.

The weather tire type 208 may be independently verified by a third-party vendor, such as a mechanic. In other embodiments, the weather tire type 208 may be verified or determined by the vehicle tire sensor 102. As noted hereinabove, the vehicle tire sensor 102 may include the camera; images from the camera may be utilized by the vehicle processor 104 to determine the at least one vehicle tire metric 202 and/or weather tire type 208. In embodiments, the vehicle processor 104 may utilize treading depth and/or treading pattern from the images to determine the weather tire type 208.

Machine readable instructions may be stored on the vehicle memory 106 that cause the metric determination model 203 to perform several functions when executed by the vehicle processor 104. For example, referring to FIG. 3, an embodiment of a process 300 is shown for use with the system diagram 200 of FIG. 2 for integration into the vehicle 100 of FIG. 1 (as may be implemented by the system 500 of FIG. 5, which is described in greater detail further below).

In block 302, at least one vehicle tire metric 202 is received from the vehicle tire sensor 102 by the metric determination model 203. In block 304, a weather tire type 208 is received. In block 306, the metric determination model 203 may generate at least one determined metric based on the at least one vehicle tire metric 202 received in block 302 and the weather tire type 208 received in block 304. In block 308, the metric determination model 203 may be configured to, when executed by the vehicle processor 104, alert the user of the vehicle 100 of the at least one determined metric.

In embodiments, a corresponding recommendation for the at least one determined metric may be generated, and the user may be alerted of the corresponding recommendation. The alert may be transmitted to the user when the at least one determined metric exceeds a threshold. The corresponding recommendation may include a suggested reduced vehicle speed to drop the at least one determined metric below the threshold. The corresponding recommendation may include a suggested maximum speed to prevent a threshold associated with the at least one determined metric from being met or exceeded.

As a non-limiting embodiment, the at least one determined metric may be a likelihood of hydroplaning, such as an 80% chance of hydroplaning if driving at a speed of 70 miles per hour or higher. The user may be alerted of the determined metric when a threshold is exceeded, such as a threshold of 30%. The corresponding recommendation may be to reduce speed to less than 55 miles per hour, which may reduce the likelihood of hydroplaning to under the threshold of 30%, and the user may be alerted of the corresponding recommendation.

The at least one determined metric may include any metric associated with a driving condition that may assist the user with minimizing driving risk. The at least one determined metric may be based on at least the at least one vehicle tire metric 202 and the weather tire type 208, as explained above. The at least one determined metric may also be based on any other vehicle characteristic/feature that would assist in determining/calculating the at least one determined metric. For example, the at least one determined metric may include a minimum stopping distance. The minimum stopping distance would be based at least in part on the received at least one vehicle tire metric 202 and the weather tire type 208. However, other vehicle characteristics/features may also be helpful in determining the minimum stopping distance. In some embodiments, a vehicle weight and/or current speed may also be utilized in determining the minimum stopping distance. Other features of the vehicle 100 that may be utilized in determining the minimum stopping distance may be whether the vehicle 100 include anti-lock brakes (ABS), a vehicle model year, or a date of brake service.

The at least one determined metric may also include a likelihood of an accident, likelihood of hydroplaning, a minimum stopping distance, combinations thereof, or any other suitable metric to assist the user in driving/warning the driver of potential hazards. The user may be notified of the at least one determined metric through the GUI of the vehicle display 110 and/or the vehicle audio components 114 of the vehicle 100, the user mobile device, or any other suitable means of notification. The likelihood of accident determination and likelihood of hydroplaning determination may be based on factors such as vehicle location and weather data at the vehicle location, as explained further below.

Figure 4:
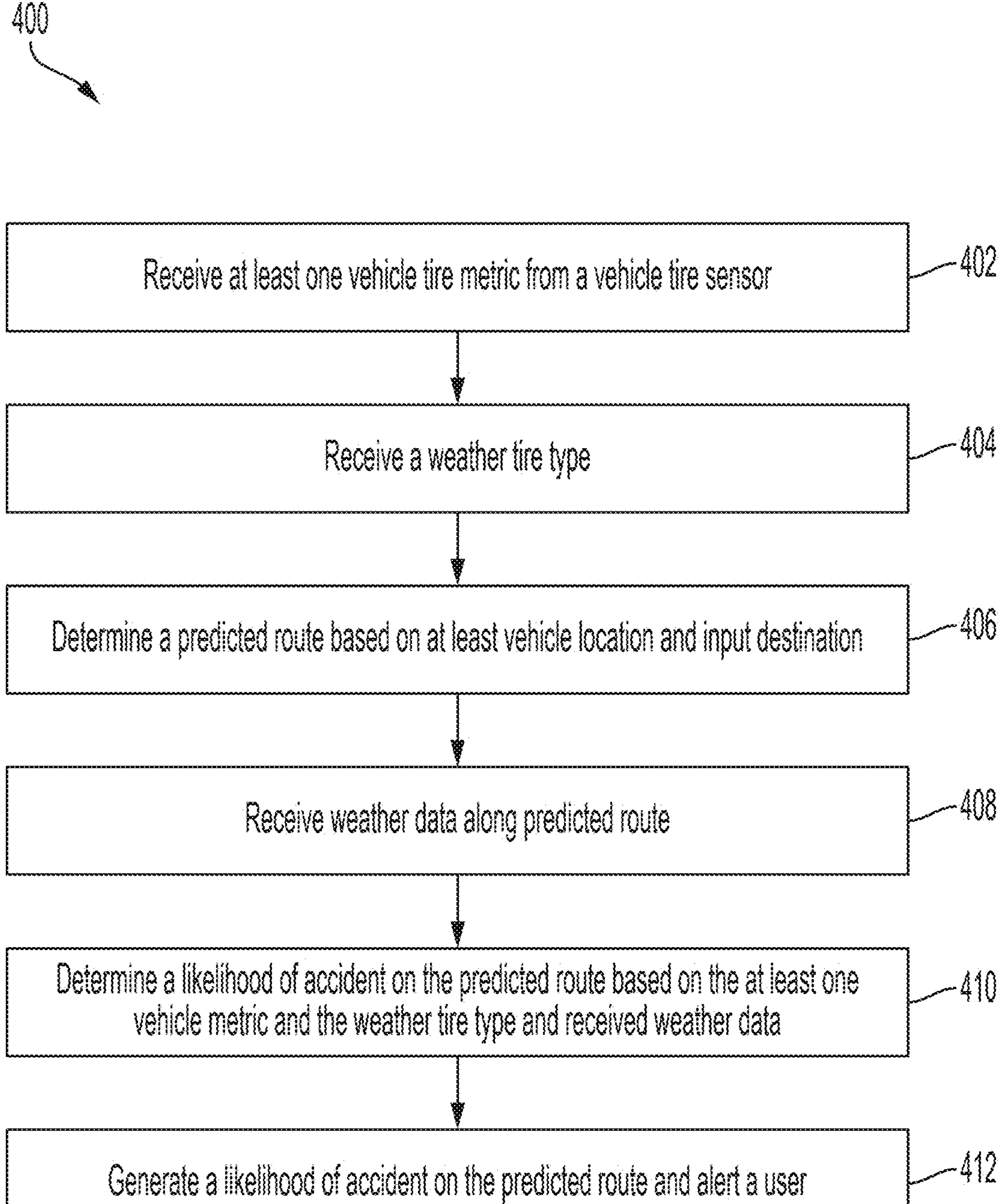
FIG. 4 illustrates a flowchart of another process for use with the vehicle of FIGS. 1-2, the process directed to determining a likelihood of accident on a predicted navigation route, according to one or more embodiments shown and described herein.

Referring now to FIG. 4, an embodiment of another process 400 is shown for use with the system diagram 200 of FIG. 2 for integration into the vehicle 100 of FIG. 1. In block 402, the metric determination model 203 may receive the at least one vehicle tire metric 202 from the vehicle tire sensor 102, while in block 404 the metric determination model 203 may receive the weather tire type 208 of the at least one tire 108. In block 406, a predicted navigation route is determined based on at least a vehicle location determined by a location sensor of the navigation module 112 and an input destination that may be input by the user via the GUI of the vehicle display 110.

In embodiments, the location sensor may be configured to generate a location of the vehicle 100, and a navigation sensor may be configured to generate a navigation route of the vehicle 100 based on the location. The navigation sensor may generate the navigation route based on a history of vehicle location data stored on the vehicle memory 106. In other embodiments, the navigation route may be determined when the user enters an input destination into the GUI of the vehicle display 110 or the user mobile device.

In block 408, weather data along a navigation route or predicted navigation route may be received. The vehicle 100 may include a weather data module (such as the weather data module 514 of FIG. 5 described in greater detail further below) configured to generate current weather data for the location and the navigation route. In embodiments, the navigation sensor may be configured to generate a predicted navigation route of the vehicle 100 based on the location and an input destination as described above, and the weather data module configured to generate current weather data for the location and the predicted navigation route. Weather data generated by the weather data module may include a temperature, precipitation percentage, adverse weather warnings/watches, historical weather patterns, etc.

In block 410, a likelihood of an accident along the predicted navigation route may be determined based on the at least one vehicle tire metric 202, the weather tire type 208, and the received weather data of block 408. The at least one determined metric may include a likelihood of an accident along the navigation route or predicted navigation route based on the current weather data. The at least one determined metric may include a likelihood of an accident along the predicted navigation route based on the current weather data.

Adverse weather generally corresponds to an increased risk of accident, while clear weather corresponds to a reduced risk of accident. As such, the at least one determined metric may include a likelihood of accident along the navigation route further based on current weather data from the weather data module. The likelihood of accident along the navigation route may also be based on predicted weather data for the navigation route. For example, the vehicle 100 may not be traveling through a particular location until a certain amount of time in the future (e.g., an hour from now). Thus, the weather data module may determine weather conditions at the particular location along the navigation route at the time when the vehicle 100 is predicted to be driving through the particular location (e.g., weather data at the particular location in an hour).

In some embodiments, the likelihood of accident along the navigation route may be dynamic. As such, the likelihood of accident along the navigation route may change over time. The likelihood of accident along the navigation route may change as the weather data module updates weather conditions and predicted weather conditions at particular locations along the navigation route. Thus, the likelihood of accident may increase when the weather data module determines that there is adverse weather (or is an increased risk of adverse weather) along the navigation route. In contrast, the likelihood of accident may decrease when the weather data module determines that there is clear weather (or a reduced risk of adverse weather) along the navigation route.

In block 412, a notification of the likelihood of accident on the predicted navigation route may be generated and the user alerted of the notification. In other embodiments, a corresponding recommendation to the user may be generated for the at least one determined metric and the user alerted of the corresponding recommendation. The corresponding recommendation may include recommending another, different route (different than the current navigation route or predicted navigation route). The alert for the different route may be presented when the likelihood of an accident along the predicted navigation route exceeds a threshold, and a likelihood of an accident along the different route is below the threshold. The recommended route may include a route in which a decreased likelihood of an accident exists due to less adverse weather and/or better traffic conditions. The user may be alerted through a vehicle device of the vehicle 100 (such as the GUI of the vehicle display 110 and/or the vehicle audio components 114 of the vehicle 100) or through the user mobile device of the user.

In some embodiments, the user may only be alerted of the corresponding recommendation when the likelihood of an accident along the navigation route or the predicted navigation route exceeds an threshold. The corresponding recommendation may also include a suggested reduced vehicle speed to drop the at least one determined metric, such as a likelihood of accident, below the threshold. The corresponding recommendation may also include a suggested maximum speed prior to the vehicle 100 traveling at the suggested maximum speed to prevent the at least one determined metric from being met or exceeded.

The threshold may be a percentage of the likelihood of accident along the navigation route or the predicted navigation route. Some percentage of accident along any route is present, as merely driving a vehicle presents some risk of accident. However, the threshold may be set to when the likelihood of accident becomes great enough to warrant a change in route or change in driving speed. The threshold may be set to 20%, 30%, 40%, 50%, or any other percentage of a likelihood of accident.

In some embodiments, a time threshold may also be included with the threshold. The time threshold may be tied to the threshold. The user may only be alerted of the corresponding recommendation when the likelihood of accident along the navigation route or the predicted navigation route exceeds an threshold, and when the time threshold is not exceeded for the corresponding threshold. There may be a greater time threshold for a higher threshold. For example, when the likelihood of accident is 20%, the corresponding time threshold may be 2 hours. Thus, when the only alternative route to drop the likelihood of accident below 20% is 3 hours, the user may not be notified of the alternative route. However, the corresponding time threshold for a likelihood of accident at 50% may be 4 hours. Thus, when the alternative route to drop the likelihood of accident below 50% is 3 hours, the user would be alerted with the recommendation for the alternative route.

The user may or may not operate the vehicle 100 in accordance with the corresponding recommendation. However, the user may be incentivized to operate the vehicle in accordance with the corresponding recommendation. For example, an insurance discount for the vehicle 100 may be generated upon detection of operations of the vehicle 100 adjusting to implement the corresponding recommendation for the at least one determined metric within a period of time. The user may be alerted of the insurance discount so that the user may operate the vehicle 100 in a manner consistent with adjustment based on and to implement the corresponding recommendation. The insurance discount for the vehicle 100 may be directly correlated to the at least one determined metric. For example, a higher insurance discount for the vehicle 100 may be generated based on implementing measures to reduce a likelihood of accident metric, such as by taking a recommended alternative route.

Just as the user may be incentivized to adhere to the corresponding recommendation through insurance discounts, the user may also be incentivized to adhere to the corresponding recommendation through insurance penalties. As such, an insurance penalty for the vehicle 100 may be generated upon detection of operations of the vehicle failing to adjust to implement the corresponding recommendation for the at least one determined metric within a period of time. The user may be alerted of the insurance penalty. In some embodiments, the user may be notified of the insurance penalty before the insurance penalty has been issued so that the user may adjust operations of the vehicle 100 before the insurance penalty is issued. Similar to the insurance discount, the insurance penalty for the vehicle 100 may be directly correlated to the at least one determined metric. For example, a higher insurance penalty for the vehicle 100 may be generated based on failing to implement measures to reduce a likelihood of accident metric, such as by failing to take a recommended alternative route.

A user may be alerted of the discounts and penalties separately, or the user may be notified of a combination of discounts and penalties. As such, in some embodiments, the discounts and/or penalties may be combined into a single alert issued to the user as a total savings for the user to adjust operations of the vehicle 100 based on and to implement the corresponding recommendation to minimize risk to the vehicle 100 as described herein.

Figure 3:
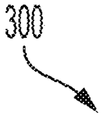
FIG. 3 illustrates a flowchart of a process for use with the vehicle and vehicle notification systems of FIGS. 1-2, the process directed to receiving a weather tire type, according to one or more embodiments shown and described herein.
Figure 3:
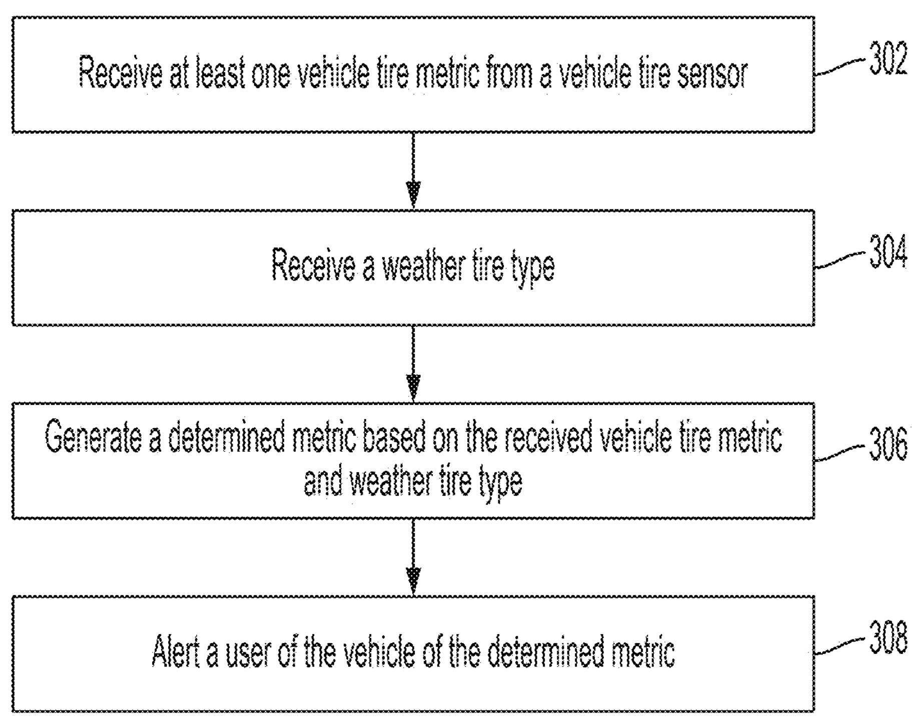
Figure 5:
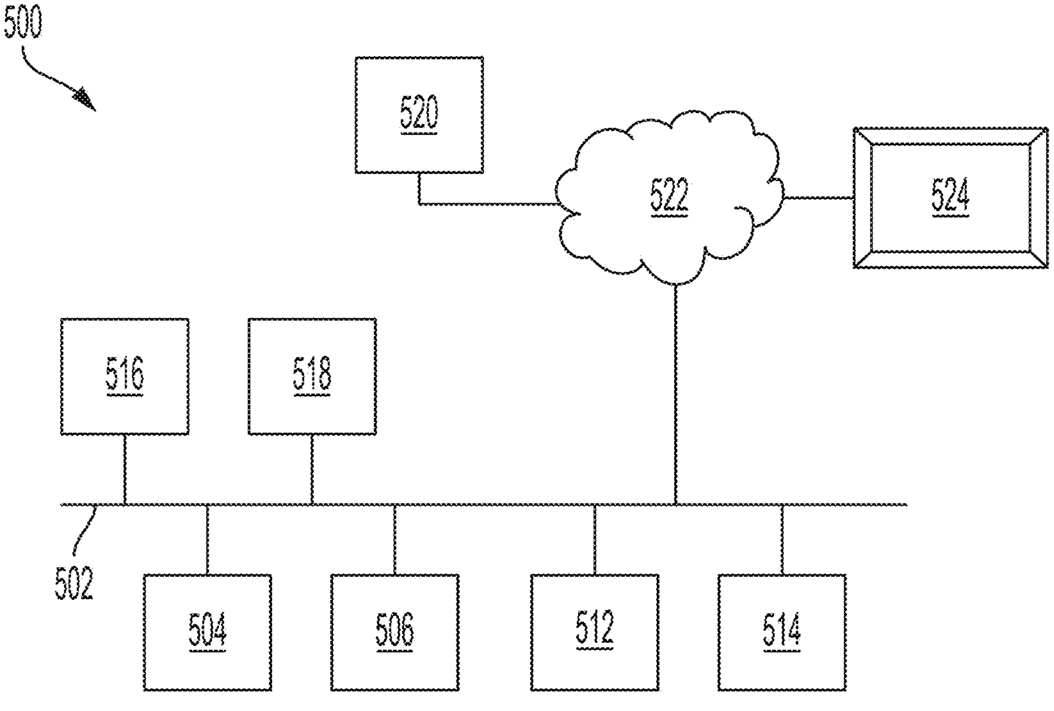
FIG. 5 illustrates a vehicle notification system for use with the vehicle and system diagram of FIGS. 1-2 and for implementing computer and software based processes as set forth in FIGS. 3-4, according to one or more embodiments shown and described herein.

Referring to FIG. 5, the system 500 (also referred to as the vehicle notification system 500 herein) is shown for implementing a computer and software-based method, such as via those of FIGS. 3-4 and the system diagram of FIG. 2.

The system 500 includes machine readable instructions stored in non-transitory memory that cause the system 500 to perform one or more of instructions when executed by the one or more processors, as described in greater detail below. The system 500 includes a communication path 502, one or more processors 504 (that may be the vehicle processor 104), a memory component 506 (that maybe the vehicle memory 106), an action processing component 512, a weather data module 514, an artificial intelligence component 516, a network interface hardware 518, a server 520, a network 522, and at least one computer 524. The various components of the system 500 and the interaction thereof will be described in detail below.

In some embodiments, the system 900 is implemented using a wide area network (WAN) or network 522, such as an intranet or the Internet, or other wired or wireless communication network that may include a cloud computing-based network configuration. The computer 524 may include digital systems and other devices permitting connection to and navigation of the network, such as the smart mobile device. Other system 500 variations allowing for communication between various geographically diverse components are possible. The lines depicted in FIG. 5 indicate communication rather than physical connections between the various components.

As noted above, the system 500 includes the communication path 502. The communication path 502 may be formed from any medium that is capable of transmitting a signal such as, for example, conductive wires, conductive traces, optical waveguides, or the like, or from a combination of mediums capable of transmitting signals. The communication path 502 communicatively couples the various components of the system 500. As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 500 includes the processor 504. The processor 504 can be any device capable of executing machine readable instructions. Accordingly, the processor 504 may be a controller, an integrated circuit, a microchip, a computer, or any other computing device. The processor 504 is communicatively coupled to the other components of the system 500 by the communication path 502. Accordingly, the communication path 502 may communicatively couple any number of processors with one another, and allow the modules coupled to the communication path 502 to operate in a distributed computing environment. Specifically, each of the modules can operate as a node that may send and/or receive data. The processor 504 may process the input signals received from the system modules and/or extract information from such signals.

As noted above, the system 500 includes the memory component 506 which is coupled to the communication path 502 and communicatively coupled to the processor 504. The memory component 506 may be a non-transitory computer readable medium or non-transitory computer readable memory and may be configured as a nonvolatile computer readable medium. The memory component 506 may comprise RAM, ROM, flash memories, hard drives, or any device capable of storing machine readable instructions such that the machine readable instructions can be accessed and executed by the processor 504. The machine readable instructions may comprise logic or algorithm(s) written in any programming language such as, for example, machine language that may be directly executed by the processor 504, or assembly language, object-oriented programming (OOP), scripting languages, microcode, etc., that may be compiled or assembled into machine readable instructions and stored on the memory component 506. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the system 500 may include the processor 504 communicatively coupled to the memory component 506 that stores instructions that, when executed by the processor 504, cause the processor 504 to perform one or more functions as described herein.

Still referring to FIG. 5, as noted above, the system 500 comprises the display such as a GUI on a screen of the computer 524, such as the head unit of the vehicle 100, for providing visual output such as, for example, information, graphical reports, messages, or a combination thereof. The computer 524 may include one or more computing devices across platforms, or may be communicatively coupled to devices across platforms, such as smart mobile devices including smartphones, tablets, laptops, and/or the like. The display on the screen of the computer 524 is coupled to the communication path 502 and communicatively coupled to the processor 504. Accordingly, the communication path 502 communicatively couples the display to other modules of the system 500. The display can include any medium capable of transmitting an optical output such as, for example, a cathode ray tube, light emitting diodes, a liquid crystal display, a plasma display, or the like. Additionally, it is noted that the display or the computer 524 can include at least one of the processor 504 and the memory component 506. While the system 500 is illustrated as a single, integrated system in FIG. 5, in other embodiments, the systems can be independent systems.

The system 500 comprises (i) the action processing component 512 configured to generate the determined metrics and corresponding alerts 204 based on receiving input data as described herein as the at least one vehicle tire metric 202 and the weather tire type 208 and (ii) the artificial intelligence component 516 configured to train the metric determination model 203 and/or provide machine learning capabilities to a neural network to aid with vehicle data/signals output as described herein. The action processing component 512 and the artificial intelligence component 516 are coupled to the communication path 502 and communicatively coupled to the processor 504. The processor 504 may process the input signals received from the system modules and/or extract information from such signals.

Data stored and manipulated in the system 500 as described herein is utilized by the artificial intelligence component 516, which is able to leverage a cloud computing-based network configuration such as the cloud to apply Machine Learning and Artificial Intelligence. This machine learning application may create models that can be applied by the system 500, to make it more efficient and intelligent in execution. As an example and not a limitation, the artificial intelligence component 516 may include components selected from the group consisting of an artificial intelligence engine, Bayesian inference engine, and a decision-making engine, and may have an adaptive learning engine further comprising a deep neural network learning engine.

The system 500 may utilize one or more artificial neural network (ANN) models as understood to those skilled in the art or as yet-to-be-developed to generate communications and alerts as described in embodiments herein. Such ANN models may include artificial intelligence components selected from the group that may include, but not be limited to, an artificial intelligence engine, Bayesian inference engine, and a decision-making engine, and may have an adaptive learning engine further including a deep neural network learning engine. The one or more ANN models may employ a combination of artificial intelligence techniques, such as, but not limited to, Deep Learning, Random Forest Classifiers, Feature extraction from audio, images, clustering algorithms, or combinations thereof.

As an example and not a limitation, a machine learning module of the ANN may include artificial intelligence components selected from the group consisting of an artificial intelligence engine, Bayesian inference engine, and a decision-making engine, and may have an adaptive learning engine further comprising a deep neural network learning engine. Data stored and manipulated in the system 500 as described herein is utilized by the machine learning module, which in embodiments able to leverage a cloud computing-based network configuration such as the cloud to apply machine learning and artificial intelligence or may be able to rely on an internal architecture to apply machine learning and artificial intelligence as described herein. This machine learning application may create models that can be applied by the intelligent machine learning to make it more efficient and intelligent in execution.

The system 500 includes the network interface hardware 518 for communicatively coupling the system 500 with a computer network such as network 522. The network interface hardware 518 is coupled to the communication path 502 such that the communication path 502 communicatively couples the network interface hardware 518 to other modules of the system 500. The network interface hardware 518 can be any device capable of transmitting and/or receiving data via a wireless network. Accordingly, the network interface hardware 518 can include a communication transceiver for sending and/or receiving data according to any wireless communication standard. For example, the network interface hardware 518 can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 5, data from various applications running on computer 524 can be provided from the computer 524 to the system 500 via the network interface hardware 518. The computer 524 can be any device having hardware (e.g., chipsets, processors, memory, etc.) for communicatively coupling with the network interface hardware 518 and a network 522. Specifically, the computer 524 can include an input device having an antenna for communicating over one or more of the wireless computer networks described above.

The network 522 can include any wired and/or wireless network such as, for example, wide area networks, metropolitan area networks, the Internet, an Intranet, the cloud, satellite networks, or the like. Accordingly, the network 522 can be utilized as a wireless access point by the computer 524 to access one or more servers (e.g., a server 520). The server 520 and any additional servers such as a cloud server generally include processors, memory, and chipset for delivering resources via the network 522. Resources can include providing, for example, processing, storage, software, and information from the server 520 to the system 500 via the network 522. Additionally, it is noted that the server 520 and any additional servers can share resources with one another over the network 522 such as, for example, via the wired portion of the network, the wireless portion of the network, or combinations thereof.

As described herein, a preferred tire for a vehicle may change depending on road conditions, weather, or time of year. For example, a summer tire with less tread (i.e., more shallow grooves) may be desired in warm and clear conditions. On the other hand, a winter tire with more tread may be desired in cold and snowy conditions. The type of tire on the vehicle may be indicative of a likelihood of the vehicle getting into an accident. Moreover, a coefficient of friction between the tire and the road may be indicative of a minimum required stopping distance.

Embodiments as described herein are directed to the utilization and processing of data from sensors in the at least one tire 108 of the vehicle 100 by an intelligent tire sensing and alert generation system as the system 500 described herein to generate an alert for a driver of the vehicle 100 such as a generated metric and/or a recommendation based on the data. For example, the recommendation may be that (i) driving over a speed of 55 miles per hour may result in an 80% likelihood of hydroplaning or that (ii) a driver at a certain speed if required to stop would require a certain determined minimum stopped distance (such as to aid in avoiding tailgating or understanding stopping distances), the recommendations based on parameters such as tire sensor data, tire type, telematics, historical data, location and/or weather data, or combinations thereof. The system 500 may be configured to identify a type of tire based on the tire sensor data, such as the tire being a winter tire certified with a severe snow rating. The tire sensors may measure vehicle metrics such as the coefficient of friction between the tire and the road, tire pressure, rate of pressure change, and/or wheel speed. The system 500 may also include cameras, GPS, or other sensors for sensing the position of stop signs or pedestrians. Based on the tire sensor data, the system 500 may determine a vehicle load, tire type (summer, all-weather, or winter), stopping distance and associated likelihood of stopping within a particular distance, and/or a likelihood of the driver being in an accident or hydroplaning on a particular route.

In embodiments, the system 500 may recognize that a stop sign is ahead based on the images captured by the camera. Based on the coefficient of friction between the tire and the road, the system 500 may notify the driver of a minimum required stopping distance and/or likelihood of stopping within the minimum required stopping distance at based on a current speed of approach; the system 500 may also notify the driver of when he/she needs to start braking in order to meet the minimum required stopping distance based on the current speed. The system 500 may notify the driver of such information through a vehicle infotainment system and/or a user mobile device.

The system 500 may also be connected to a network of vehicles, such that the vehicle metrics measured by all vehicles in the network of vehicles are available for the system 500 to process. Based on the vehicle metrics measured by vehicles in the network of vehicles, the system 500 may notify the driver of the likelihood of an accident occurring based on a predicted driver route; thus, the system 500 may notify the driver through a mobile device of a likelihood of an accident before the driver begins driving the predicted driver route. Alternatively, if the driver is already in route to a destination, the system 500 may notify the driver that adverse weather is ahead and that the driver has a certain likelihood of hydroplaning and/or getting into an accident. The system 500 may utilize artificial intelligence or machine-learning to determine the likelihood of an accident and/or the likelihood of hydroplaning based on the measured vehicle metrics or the vehicle metrics from the network of vehicles.

The system 500 may also generate auto insurance quotes and/or incentives for safe driving based on the vehicle metrics. For example, if the driver is constantly driving in poor weather conditions with a low coefficient of friction between the tire and the road, the system 500 may notify the driver that a driver insurance quote is increasing due to a poor coefficient of friction between the tire and the road; the system 500 may notify the driver that getting new tires on the vehicle or switching to winter tires may cause the driver insurance quote to decrease. The system 500 may further provide recommendations based on the tire sensor data to the driver such as when to service one or more of the tires, such as based on sensed pressure or determined coefficient of friction, and/or whether to change a type of tire based on weather trends of a location in which the vehicle routinely travels. In embodiments, a sense rate of pressure change may indicate a flat tire such that the system 500 alerts the driver and recommends corrective actions and/or determines, records, and potential transmits alerts regarding locations of potholes or other hazard areas leading to the sensed flat tire.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

Aspects Listing

Aspect 1. A vehicle notification system, the system including: at least one processor, a vehicle including at least one tire, a vehicle tire sensor of the vehicle associated with the at least one tire, the vehicle tire sensor communicatively coupled to the at least one processor, wherein the vehicle tire sensor generates at least one vehicle tire metric associated with the at least one tire of the vehicle, a memory communicatively coupled to the at least one processor, and one or more machine readable instructions stored in the memory that cause the vehicle notification system to perform at least the following when executed by the at least one processor: receive the at least one vehicle tire metric from the vehicle tire sensor associated with the at least one tire of the vehicle, receive a weather tire type of the at least one tire of the vehicle, generate, based on the on the at least one vehicle tire metric and the weather tire type, at least one determined metric, and generate an alert for a user of the vehicle of the at least one determined metric.

Aspect 2. The vehicle notification system of Aspect 1, wherein the weather tire type is indicative of a season type that the at least one tire is made for and corresponding treading such that a treading for a first season type is deeper than a treading for a second season type.

Aspect 3. The vehicle notification system of Aspect 2, wherein the first season type is associated with winter such that the weather tire type is a winter tire, and the second season type is associated with all-seasons, such that the weather tire type is an all-seasons tire.

Aspect 4. The vehicle notification system of any of Aspect 1 to Aspect 3, wherein the at least one determined metric comprises a likelihood of hydroplaning, a minimum stopping distance, a likelihood of an accident, or combinations thereof.

Aspect 5. The vehicle notification system of any of Aspect 1 to Aspect 4, further including a location sensor of the vehicle configured to generate a location and of the vehicle, a navigation sensor configured to generate a navigation route of the vehicle based on the location, and a weather data module configured to generate current weather data for the location and the navigation route, wherein the at least one determined metric comprises a likelihood of an accident along the navigation route based on the current weather data.

Aspect 6. The vehicle notification system of any of Aspect 1 to Aspect 5, further including a location sensor of the vehicle configured to generate a location of the vehicle, a navigation sensor configured to generate a predicted navigation route based on the location and an input destination, and a weather data module configured to generate current weather data for the location and the predicted navigation route, wherein the at least one determined metric comprising a likelihood of an accident along the predicted navigation route based on the current weather data.

Aspect 7. The vehicle notification system of Aspect 6, wherein the one or more machine readable instructions further cause the vehicle notification system to perform at least the following when executed by the at least one processor: generate a corresponding recommendation for the at least one determined metric, and alert the user of the corresponding recommendation, wherein the corresponding recommendation comprises a recommendation of a different route than the predicted navigation route when the likelihood of an accident along the predicted navigation route exceeds a threshold, wherein a likelihood of an accident along the different route is below the threshold.

Aspect 8. The vehicle notification system of any of Aspect 1 to Aspect 7, wherein the one or more machine readable instructions further cause the vehicle notification system to perform at least the following when executed by the at least one processor: generate a corresponding recommendation for the at least one determined metric, and alert the user of the corresponding recommendation.

Aspect 9. The vehicle notification system of Aspect 8, wherein the one or more machine readable instructions further cause the vehicle notification system to perform at least the following when executed by the at least one processor: generate an insurance discount for the vehicle upon detection of operations of the vehicle adjusting to implement the corresponding recommendation for the at least one determined metric with a period of time, and alert the user of the insurance discount.

Aspect 10. The vehicle notification system of Aspect 8 or Aspect 9, wherein the one or more machine readable instructions further cause the vehicle notification system to perform at least the following when executed by the at least one processor: generate an insurance penalty for the vehicle upon detection of operations of the vehicle failing to adjust to implement the corresponding recommendation for the at least one determined metric with a period of time, and alert the user of the insurance penalty.

Aspect 11. The vehicle notification system of any of Aspect 8 to Aspect 10, wherein the alert is transmitted to the user when the at least one determined metric exceeds a threshold.

Aspect 12. The vehicle notification system of any of Aspect 11, wherein the corresponding recommendation comprises a suggested reduced vehicle speed to drop the at least one determined metric below the threshold.

Aspect 13. The vehicle notification system of any of Aspect 8 to Aspect 12, wherein the corresponding recommendation comprises a suggested maximum speed to prevent a threshold associated with the at least one determined metric from being met or exceeded.

Aspect 14. The vehicle notification system of any of Aspect 1 to Aspect 13, wherein the vehicle tire sensor comprises a tire pressure sensor configured to determine a tire pressure level of the at least one tire, wherein the at least one vehicle tire metric comprises the tire pressure level.

Aspect 15. The vehicle notification system of any of Aspect 1 to Aspect 14, wherein the alert is transmitted to the user through a vehicle device of the vehicle or a user mobile device of the user.

Aspect 16. A vehicle notification system, the system comprising: at least one processor, a vehicle including at least one tire, a vehicle tire sensor of the vehicle associated with the at least one tire, the vehicle tire sensor communicatively coupled to the at least one processor, wherein the vehicle tire sensor generates at least one vehicle tire metric associated with the at least one tire of the vehicle, a memory communicatively coupled to the at least one processor, and one or more machine readable instructions stored in the memory that cause the vehicle notification system to perform at least the following when executed by the at least one processor: receive the at least one vehicle tire metric from the vehicle tire sensor associated with the at least one tire of the vehicle, receive a weather tire type of the at least one tire of the vehicle, wherein the weather tire type is indicative of a season type that the at least one tire is made for and corresponding treading such that a treading for a first season type is deeper than a treading for a second season type, generate, based on the on the at least one vehicle tire metric and the weather tire type, at least one determined metric, generate a corresponding recommendation for the at least one determined metric, generate an alert for a user of the at least one determined metric and the corresponding recommendation, and transmit the alert to the user when the at least one metric exceeds a threshold.

Aspect 17. The vehicle notification system of any of Aspect 16, wherein the first season type is winter such that the weather tire type is a winter tire, and the second season type is all-seasons, such that the weather tire type is an all-seasons tire.

Aspect 18. The vehicle notification system of any of Aspect 16 or Aspect 17, wherein the at least one determined metric comprises a likelihood of hydroplaning, a minimum stopping distance, a likelihood of an accident, or combinations thereof.

Aspect 19. A method including: receiving, by a computing device of a vehicle, at least one vehicle tire metric from a vehicle tire sensor associated with at least one tire of the vehicle, receiving a weather tire type of the at least one tire of the vehicle, generating, based on the on the at least one vehicle tire metric and the weather tire type, at least one determined metric, and generating an alert for a user of the vehicle of the at least one determined metric.

Aspect 20. The method of Aspect 19, wherein the weather tire type is indicative of a season type that the at least one tire is made for and corresponding treading such that a treading for a first season type is deeper than a treading for a second season type, the at least one determined metric includes a likelihood of hydroplaning, a minimum stopping distance, a likelihood of an accident, or combinations thereof, and further including: generating a corresponding recommendation for the at least one determined metric, and transmitting the alert including at least one determined metric and the corresponding recommendation when the at least one metric exceeds a threshold.

What is claimed is:

1. A vehicle notification system, the system comprising:

at least one processor;

a vehicle comprising at least one tire;

a vehicle tire sensor of the vehicle associated with the at least one tire, the vehicle tire sensor communicatively coupled to the at least one processor, wherein the vehicle tire sensor generates at least one vehicle tire metric associated with the at least one tire of the vehicle;

a memory communicatively coupled to the at least one processor; and one or more machine readable instructions stored in the memory that cause the vehicle notification system to perform at least the following when executed by the at least one processor:

transmit from the vehicle tire sensor associated with the at least one tire of the vehicle the at least one vehicle tire metric;

receive the at least one vehicle tire metric from the vehicle tire sensor associated with the at least one tire of the vehicle;

receive a weather tire type of the at least one tire of the vehicle;

generate, based on the on the at least one vehicle tire metric and the weather tire type, at least one determined metric; and generate an alert for a user of the vehicle of the at least one determined metric.

2. The vehicle notification system of claim 1, wherein the weather tire type is indicative of a season type that the at least one tire is made for and corresponding treading such that a treading for a first season type is deeper than a treading for a second season type.

3. The vehicle notification system of claim 2, wherein the first season type is associated with winter such that the weather tire type is a winter tire, and the second season type is associated with all-seasons, such that the weather tire type is an all-seasons tire.

4. The vehicle notification system of claim 1, wherein the at least one determined metric comprises a likelihood of hydroplaning, a minimum stopping distance, a likelihood of an accident, or combinations thereof.

5. The vehicle notification system of claim 1, further comprising a location sensor of the vehicle configured to generate a location of the vehicle, a navigation sensor configured to generate a navigation route of the vehicle based on the location, and a weather data module configured to generate current weather data for the location and the navigation route, wherein the at least one determined metric comprises a likelihood of an accident along the navigation route based on the current weather data.

6. The vehicle notification system of claim 1, further comprising a location sensor of the vehicle configured to generate a location of the vehicle, a navigation sensor configured to generate a predicted navigation route based on the location and an input destination, and a weather data module configured to generate current weather data for the location and the predicted navigation route, wherein the at least one determined metric comprising a likelihood of an accident along the predicted navigation route based on the current weather data.

7. The vehicle notification system of claim 6, wherein the one or more machine readable instructions further cause the vehicle notification system to perform at least the following when executed by the at least one processor:

generate a corresponding recommendation for the at least one determined metric; and alert the user of the corresponding recommendation, wherein the corresponding recommendation comprises a recommendation of a different route than the predicted navigation route when the likelihood of an accident along the predicted navigation route exceeds a threshold, wherein a likelihood of an accident along the different route is below the threshold.

8. The vehicle notification system of claim 1, wherein the one or more machine readable instructions further cause the vehicle notification system to perform at least the following when executed by the at least one processor:

generate a corresponding recommendation for the at least one determined metric; and alert the user of the corresponding recommendation.

9. The vehicle notification system of claim 8, wherein the one or more machine readable instructions further cause the vehicle notification system to perform at least the following when executed by the at least one processor:

generate an insurance discount for the vehicle upon detection of operations of the vehicle adjusting to implement the corresponding recommendation for the at least one determined metric with a period of time; and alert the user of the insurance discount.

10. The vehicle notification system of claim 8, wherein the one or more machine readable instructions further cause the vehicle notification system to perform at least the following when executed by the at least one processor:

generate an insurance penalty for the vehicle upon detection of operations of the vehicle failing to adjust to implement the corresponding recommendation for the at least one determined metric with a period of time; and alert the user of the insurance penalty.

11. The vehicle notification system of claim 8, wherein the alert is transmitted to the user when the at least one determined metric exceeds a threshold.

12. The vehicle notification system of claim 11, wherein the corresponding recommendation comprises a suggested reduced vehicle speed to drop the at least one determined metric below the threshold.

13. The vehicle notification system of claim 8, wherein the corresponding recommendation comprises a suggested maximum speed to prevent a threshold associated with the at least one determined metric from being met or exceeded.

14. The vehicle notification system of claim 1, wherein the vehicle tire sensor comprises a tire pressure sensor configured to determine a tire pressure level of the at least one tire, wherein the at least one vehicle tire metric comprises the tire pressure level.

15. The vehicle notification system of claim 1, wherein the alert is transmitted to the user through a vehicle device of the vehicle or a user mobile device of the user.

16. A vehicle notification system, the system comprising:

at least one processor;

a vehicle comprising at least one tire;

a vehicle tire sensor of the vehicle associated with the at least one tire, the vehicle tire sensor communicatively coupled to the at least one processor, wherein the vehicle tire sensor generates at least one vehicle tire metric associated with the at least one tire of the vehicle;

a memory communicatively coupled to the at least one processor; and one or more machine readable instructions stored in the memory that cause the vehicle notification system to perform at least the following when executed by the at least one processor:

receive the at least one vehicle tire metric from the vehicle tire sensor associated with the at least one tire of the vehicle;

receive a weather tire type of the at least one tire of the vehicle, wherein the weather tire type is indicative of a season type that the at least one tire is made for and corresponding treading such that a treading for a first season type is deeper than a treading for a second season type;

generate, based on the on the at least one vehicle tire metric and the weather tire type, at least one determined metric;

generate a corresponding recommendation for the at least one determined metric;

generate an alert for a user of the at least one determined metric and the corresponding recommendation; and transmit the alert to the user when the at least one metric exceeds a threshold.

17. The vehicle notification system of claim 16, wherein the first season type is winter such that the weather tire type is a winter tire, and the second season type is all-seasons, such that the weather tire type is an all-seasons tire.

18. The vehicle notification system of claim 16, wherein the at least one determined metric comprises a likelihood of hydroplaning, a minimum stopping distance, a likelihood of an accident, or combinations thereof.

19. A method comprising:

transmitting, from a vehicle tire sensor associated with at least one tire of a vehicle, at least one vehicle tire metric;

receiving, by a computing device of the vehicle, the at least one vehicle tire metric from the vehicle tire sensor associated with the at least one tire of the vehicle;

receiving a weather tire type of the at least one tire of the vehicle;

generating, based on the on the at least one vehicle tire metric and the weather tire type, at least one determined metric; and generating an alert for a user of the vehicle of the at least one determined metric.

20. The method of claim 19, wherein the weather tire type is indicative of a season type that the at least one tire is made for and corresponding treading such that a treading for a first season type is deeper than a treading for a second season type, the at least one determined metric comprises a likelihood of hydroplaning, a minimum stopping distance, a likelihood of an accident, or combinations thereof, and further comprising:

generating a corresponding recommendation for the at least one determined metric; and transmitting the alert including at least one determined metric and the corresponding recommendation when the at least one metric exceeds a threshold.

* * * * *